US008451340B2

(12) United States Patent
Tamagawa

(10) Patent No.: US 8,451,340 B2
(45) Date of Patent: May 28, 2013

(54) IMAGE PROCESSING APPARATUS AND IMAGE PROCESSING METHOD FOR FAITHFUL RECONSTRUCTION FROM A TONE-CONVERTED IMAGE

(75) Inventor: Kei Tamagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/765,584

(22) Filed: Apr. 22, 2010

(65) Prior Publication Data
US 2010/0283861 A1 Nov. 11, 2010

(30) Foreign Application Priority Data

May 7, 2009 (JP) ................................. 2009-112981

(51) Int. Cl.
*H04N 5/228* (2006.01)
*G06K 9/40* (2006.01)

(52) U.S. Cl.
USPC ........................................ 348/222.1; 382/274

(58) Field of Classification Search
USPC ................... 348/222.1, 273, 231.6; 382/162, 382/167, 274
See application file for complete search history.

(56) References Cited

U.S. PATENT DOCUMENTS

| 7,023,580 | B2 * | 4/2006 | Zhang et al. | 358/1.9 |
| 7,130,485 | B2 * | 10/2006 | Gindele et al. | 382/274 |
| 2004/0066980 | A1 * | 4/2004 | Gindele et al. | 382/274 |
| 2004/0096103 | A1 * | 5/2004 | Gallagher et al. | 382/167 |
| 2006/0104533 | A1 * | 5/2006 | Daly et al. | 382/254 |
| 2006/0262363 | A1 * | 11/2006 | Henley | 358/516 |
| 2009/0027558 | A1 * | 1/2009 | Mantiuk et al. | 348/673 |

OTHER PUBLICATIONS

Kuang, J., et al., "iCAM06: A refined image appearance model for HDR image rendering", Science Direct, J. Vis. Commun. Image R. 18 pp. 406-414 (2007).

* cited by examiner

*Primary Examiner* — Sinh Tran
*Assistant Examiner* — Selam Gebriel
(74) *Attorney, Agent, or Firm* — Fitzpatrick, Cella, Harper & Scinto

(57) ABSTRACT

It is difficult to reproduce an original tone when reconstructing an HDR image from an image tone-converted into an LDR image. A tone conversion unit generates an adaptation point image $XYZ_L$ representing an adaptation point corresponding to each pixel of an original image XYZ. The tone conversion unit converts the tone of the original image XYZ by smoothing based on the adaptation point image $XYZ_L$, generating a tone-converted image $XYZ_{dev}$. Then, an addition unit adds the adaptation point image $XYZ_L$ to the tone-converted image $XYZ_{dev}$, generating an adaptation point image-attached tone-converted image $XYZ_{devL}$. The original image XYZ can be precisely reconstructed from the adaptation point image-attached tone-converted image $XYZ_{devL}$.

8 Claims, 14 Drawing Sheets

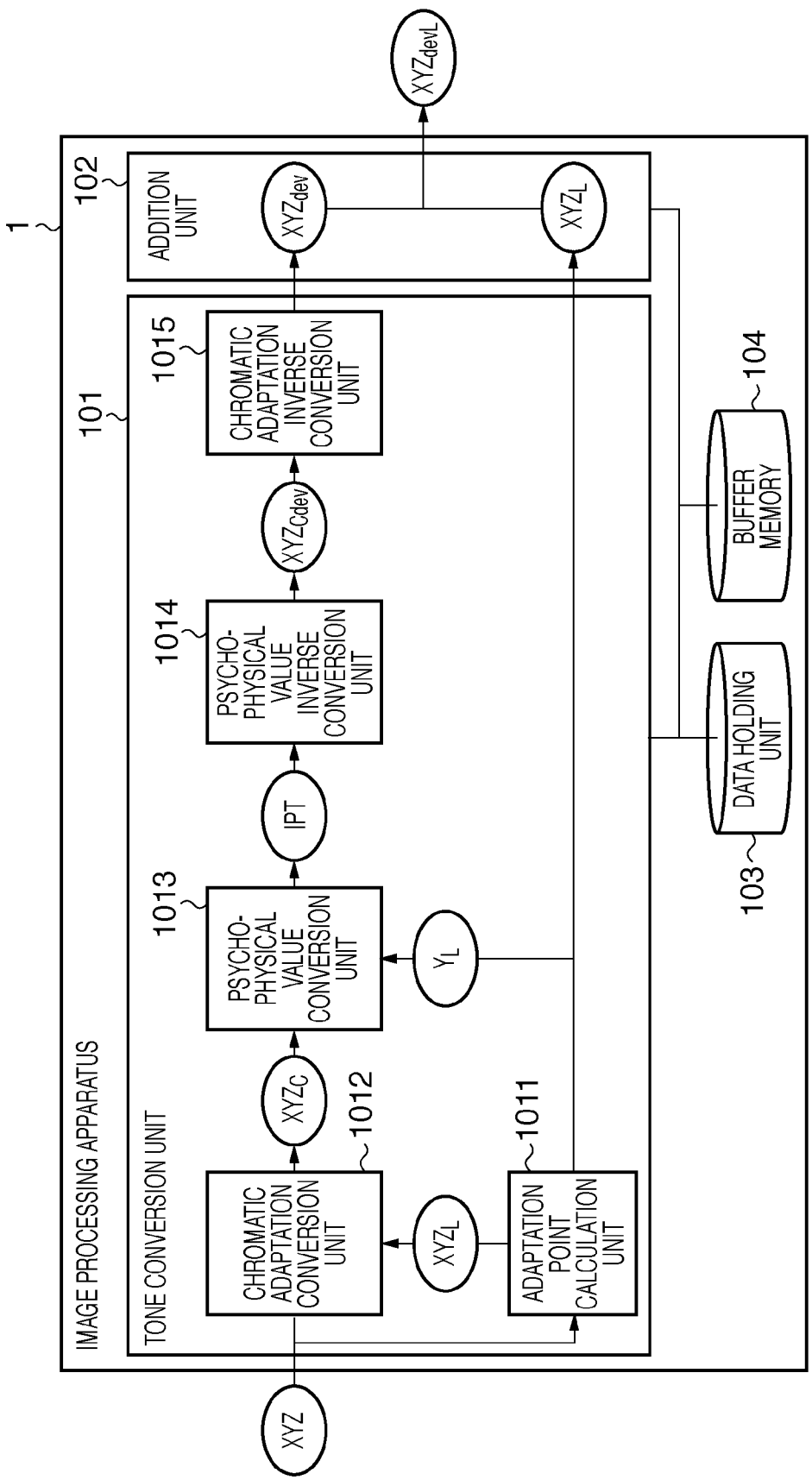

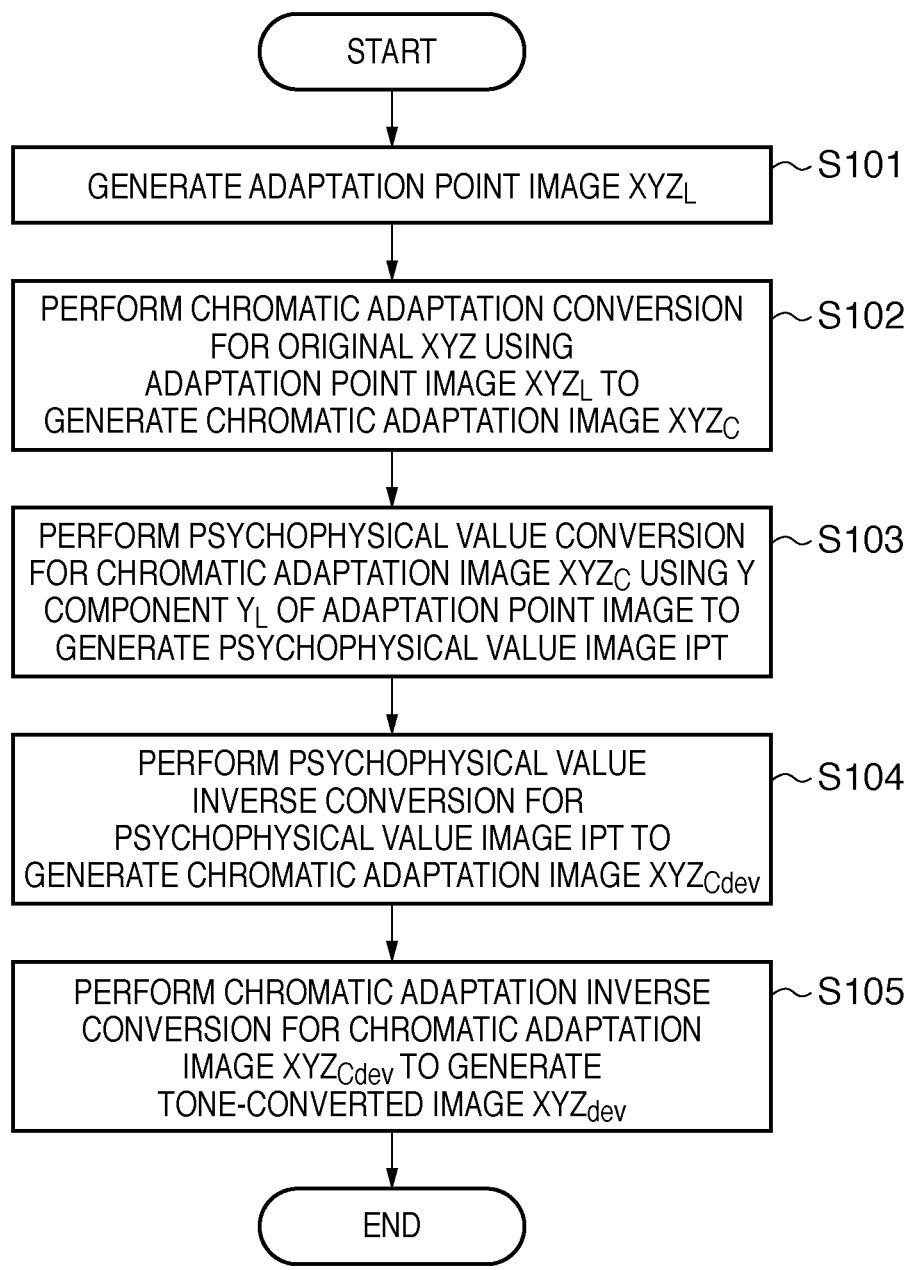

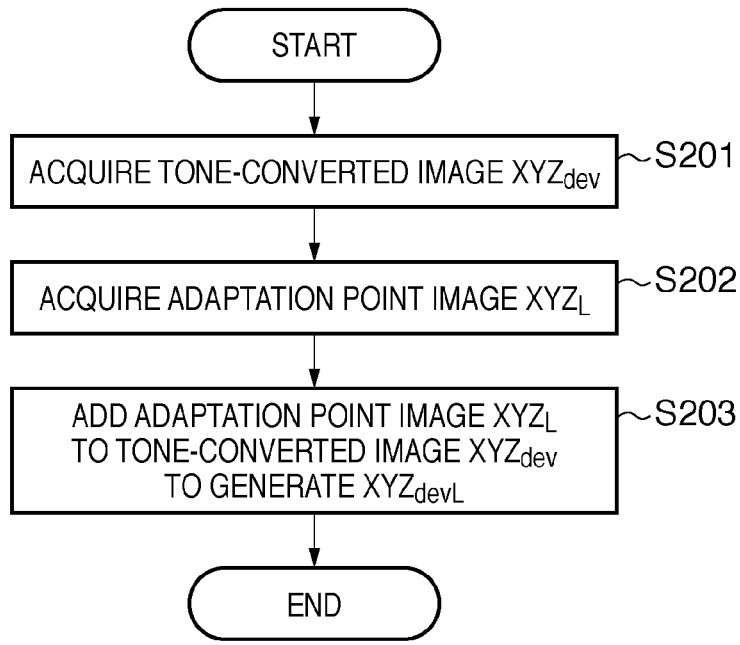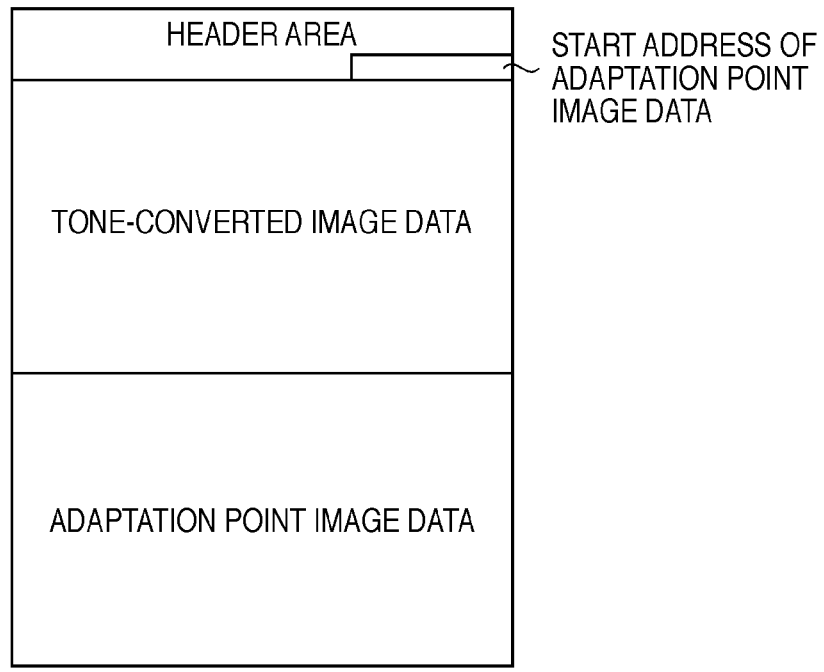

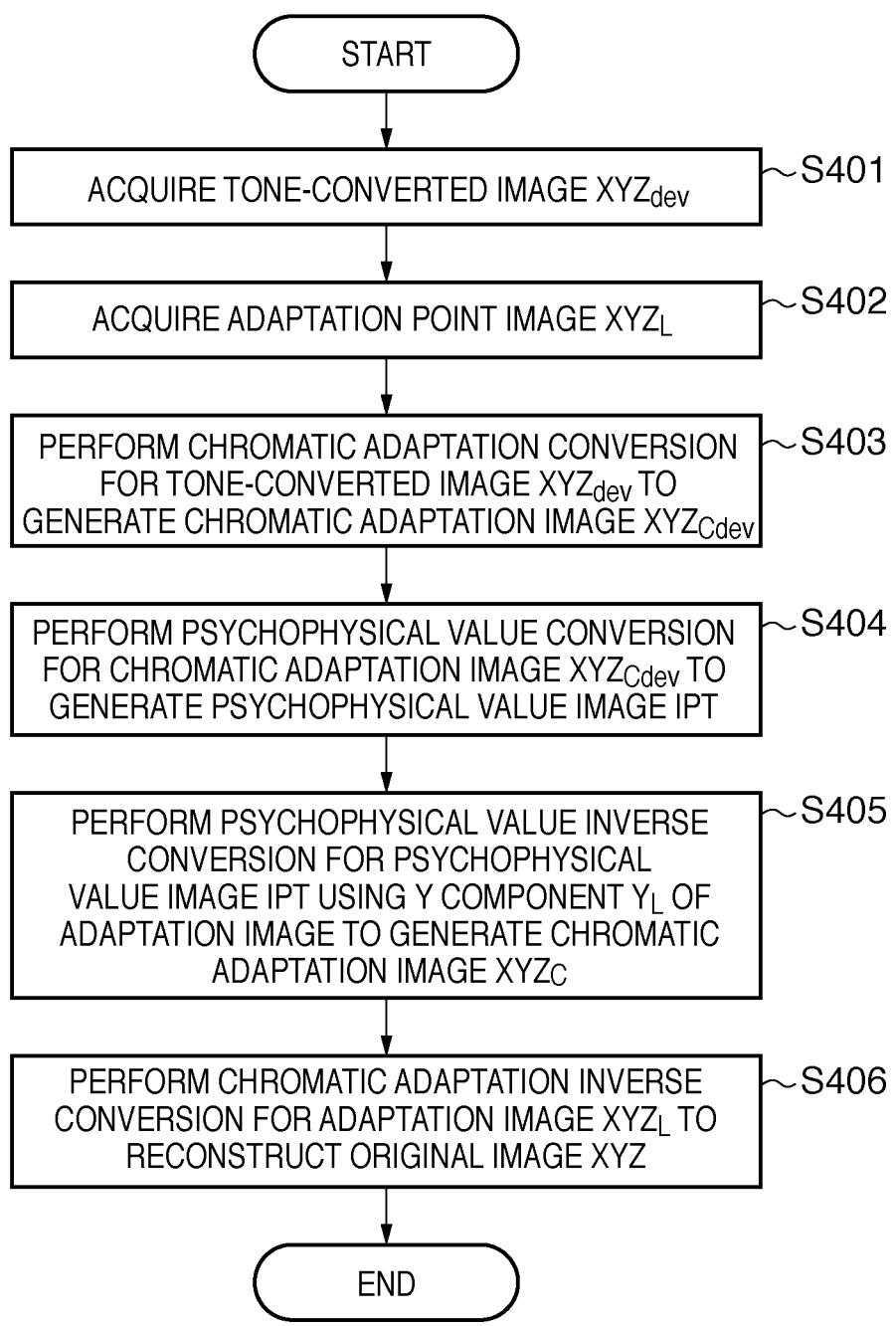

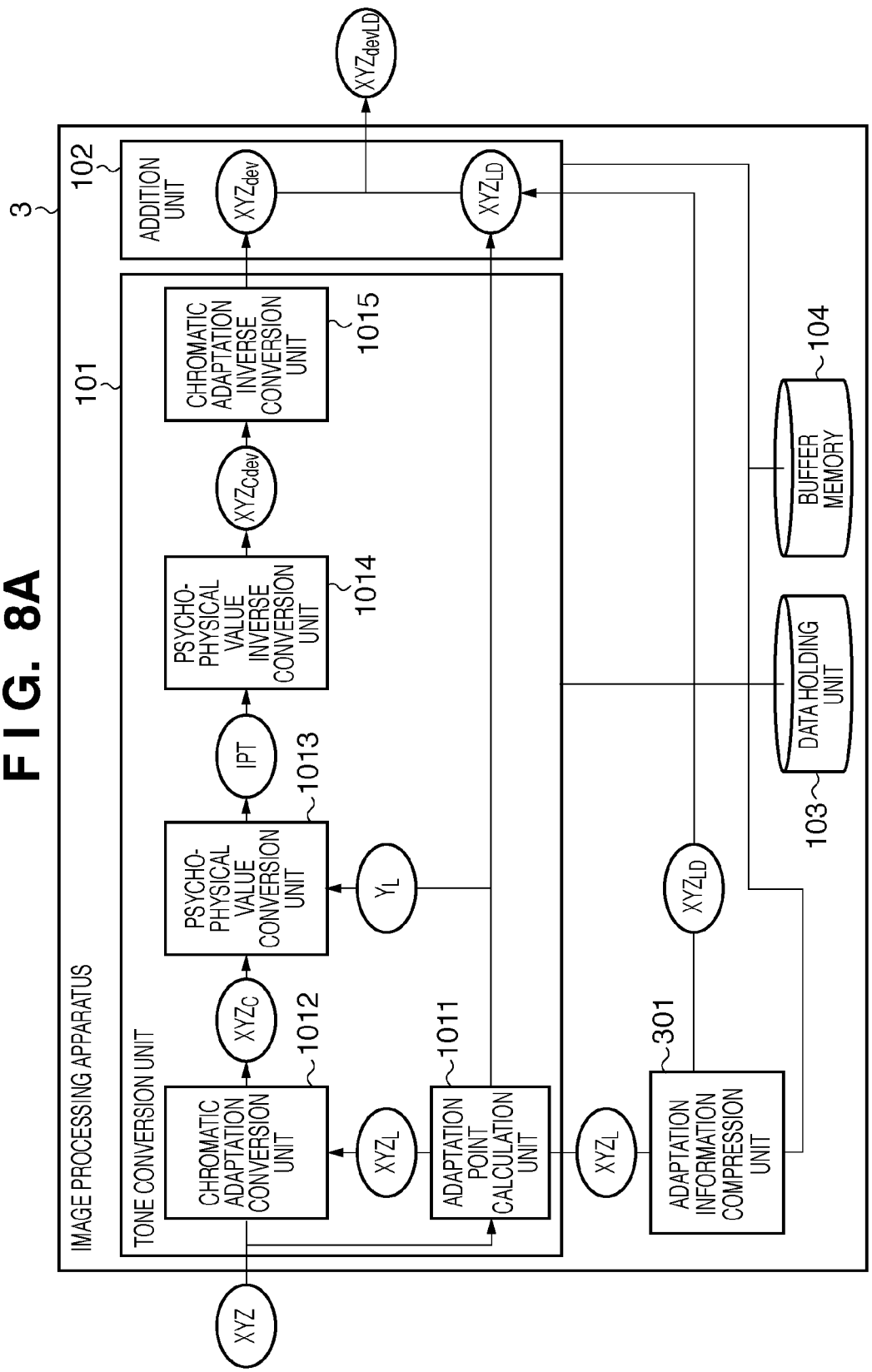

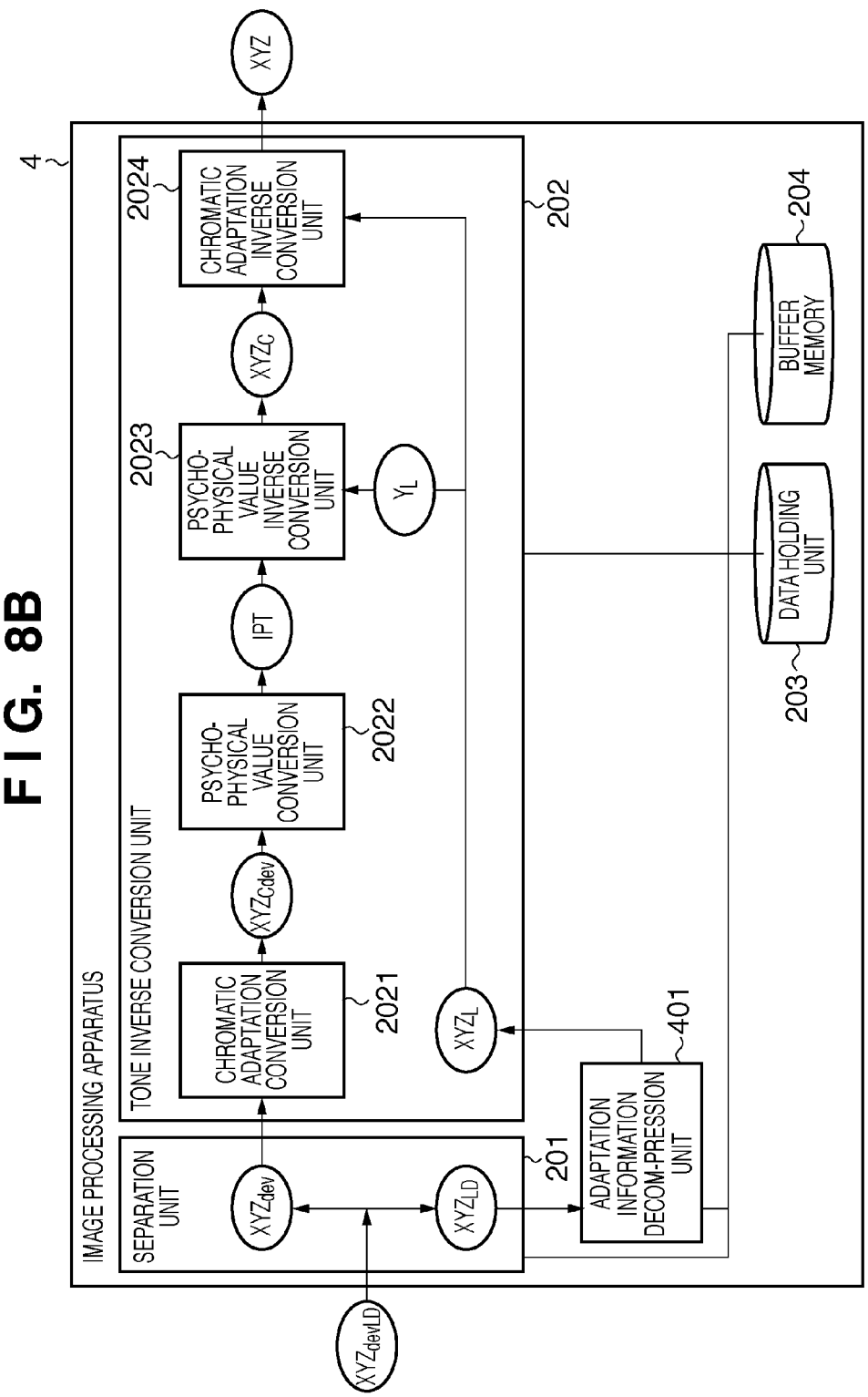

IMAGE PROCESSING APPARATUS AND IMAGE PROCESSING METHOD FOR FAITHFUL RECONSTRUCTION FROM A TONE-CONVERTED IMAGE

BACKGROUND OF THE INVENTION

1. Field of the Invention

The present invention relates to an image processing apparatus and image processing method for generating a tone-converted image from a color image.

2. Description of the Related Art

When a user photographs a certain scene with a digital camera outdoors, the luminance range of the target scene is sometimes wider than a photographable luminance range. In this case, tone information of an object outside the photographable luminance range cannot be recorded, so a highlight detail loss or shadow detail loss occurs. For example, when a person is photographed outdoors on a fine day while the exposure is adjusted to him, a highlight detail loss may occur in the background including the sky and clouds, or a shadow detail loss may occur in the shade of trees.

On the other hand, human vision has a characteristic called "local adaptation" that switches the adaptation state according to the brightness of a region one views to perceive the brightness and color. With this characteristic, one can perceive tones in both bright and dark places. For this reason, an impression upon directly viewing a photographed image suffering highlight detail loss or shadow detail loss sometimes differs from that upon viewing an actual scene. This has been a complaint of some digital camera users.

One technique for solving this problem is known as a HDR (High Dynamic Range) technique. The HDR technique roughly includes an HDR capture technique and HDR reproduction technique. The HDR capture technique is used to expand the photographable dynamic range and record tone information of a luminance range suffering a highlight detail loss or shadow detail loss. An example of this technique is a method of compositing images photographed at a plurality of exposure values. An image acquired by the HDR capture technique will be called an HDR image. The HDR reproduction technique is a dynamic range compression technique for reproducing an HDR image having a wide dynamic range by a display/output device having a narrow dynamic range. An example of this technique is a method of compressing the low-frequency components of an HDR image. The HDR technique can reduce highlight detail losses and shadow detail losses by the capture technique for expanding the dynamic range and a corresponding reproduction technique.

A variety of methods have been proposed as dynamic range compression techniques. For example, "iCAM06" proposed by J. Kuang et al. is a dynamic range compression technique based on an idea of reproducing, by a display/output device, an impression when one views a scene (see, e.g., Kuang, J., Johnson, G. M., Fairchild, M. D., "iCAM06: A refined image appearance model for HDR image rendering", Journal of Visual Communication, 2007). In "iCAM06", the appearance of the brightness and color perceived by a viewer in a photographing scene is first simulated using an HDR image. Then, the brightness and color are converted into those reproducible by the output device. Finally, the reproducible brightness and color are converted into signal values for the display/output device. By compressing the tone of an original image using this technique, a low dynamic range device (LDR device) can reproduce a satisfactory tone.

With a tone conversion technique such as "iCAM06", the LDR device can achieve satisfactory tone reproduction. However, the following problem arises when an HDR device displays an image (LDR image) tone-converted for LDR. More specifically, an LDR image does not hold reconstruction information for an HDR image. When displaying an LDR image on an HDR device, the signal value of the LDR image is directly input to the HDR device. Hence, the LDR image displayed on the HDR device cannot reproduce the original tone.

SUMMARY OF THE INVENTION

To solve the above problems, the present invention provides an image processing apparatus and image processing method capable of faithfully reproducing an original image by adding reconstruction information when generating a tone-converted image from the original image.

According to the first aspect of the present invention, an image processing apparatus comprising: a generation unit adapted to generate adaptation point image data indicating an adaptation point corresponding to each pixel of original image data; a tone conversion unit adapted to convert a tone of the original image data based on the adaptation point image data, generating converted image data; and an addition unit adapted to add the adaptation point image data to the converted image data.

According to the second aspect of the present invention, an image processing method comprising the steps of: generating adaptation point image data indicating an adaptation point corresponding to each pixel of original image data; converting a tone of the original image data based on the adaptation point image data to generate converted image data; and adding the adaptation point image data to the converted image data.

According to the third aspect of the present invention, a computer-readable storage medium storing a program for controlling a computer, the program causing the computer to function as a generation unit adapted to generate adaptation point image data indicating an adaptation point corresponding to each pixel of original image data, a tone conversion unit adapted to convert a tone of the original image data based on the adaptation point image data, generating converted image data, and an addition unit adapted to add the adaptation point image data to the converted image data.

Further features of the present invention will be apparent from the following description of exemplary embodiments with reference to the attached drawings.

BRIEF DESCRIPTION OF THE DRAWINGS

FIG. 1A is a block diagram showing the arrangement of an image processing apparatus on the transmitting side in an embodiment according to the present invention;

FIG. 3 is a flowchart showing a tone conversion process in the embodiment;

FIG. 4 is a flowchart showing an image addition process in the embodiment;

FIG. 5 is a view exemplifying addition of an adaptation point image to a tone-converted image in the embodiment;

FIG. 7 is a flowchart showing a tone inverse conversion process in the embodiment;

FIG. 8A is a block diagram showing the arrangement of an image processing apparatus on the transmitting side in the second embodiment;

FIG. 8B is a block diagram showing the arrangement of an image processing apparatus on the receiving side in the second embodiment;

DESCRIPTION OF THE EMBODIMENTS

An embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In the first embodiment, when generating a tone-converted image by converting the tone of an original image, an adaptation point image representing an adaptation point corresponding to each pixel of the original image is generated and added to the tone-converted image. When reconstructing the original image from the tone-converted image, tone inverse conversion can be executed using the adaptation point image. Thus, the original image can be faithfully reconstructed. Note that the original image is assumed to be an HDR image, and the tone-converted image is assumed to be a sRGB image.

Apparatus Arrangement

Figure 1B:
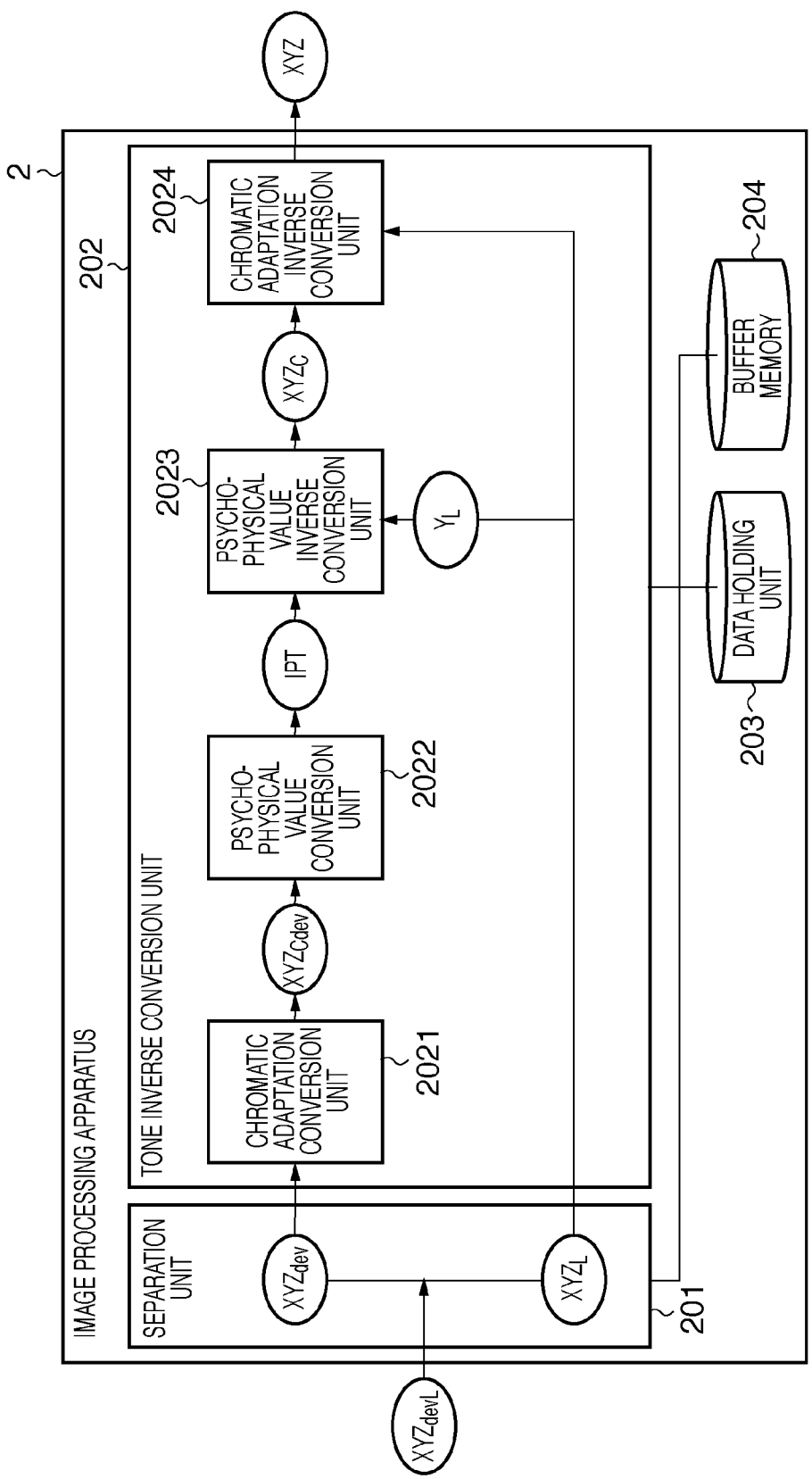
FIG. 1B is a block diagram showing the arrangement of an image processing apparatus on the receiving side in the embodiment according to the present invention.

FIGS. 1A and 1B are block diagrams each showing a hardware arrangement which implements an image processing apparatus in the first embodiment. FIG. 1A shows an image processing apparatus 1 on the transmitting side, that is, tone-converted image generating side. FIG. 1B shows an image processing apparatus 2 on the receiving side, that is, original image reconstructing side.

In the image processing apparatus 1, a tone conversion unit 101 converts the luminance range of an original image into that of the sRGB color space, generating a tone-converted image.

In the tone conversion unit 101, an adaptation point calculation unit 1011 calculates an adaptation point corresponding to each pixel of an original image, generating an adaptation point image. A chromatic adaptation conversion unit 1012 performs chromatic adaptation conversion considering local adaptation for the original image based on the adaptation point image, generating a chromatic adaptation-converted image. A psychophysical value conversion unit 1013 performs psychophysical value conversion for the chromatic adaptation-converted image using the Y component of the adaptation point image, generating a psychophysical value image. A psychophysical value inverse conversion unit 1014 performs psychophysical value inverse conversion for the psychophysical value image, generating a chromatic adaptation image. A chromatic adaptation inverse conversion unit 1015 performs chromatic adaptation inverse conversion for the chromatic adaptation image, generating a tone-converted image.

An addition unit 102 adds an adaptation point image calculated in tone conversion by the tone conversion unit 101 to a tone-converted image also generated by the tone conversion unit 101.

A data holding unit 103 holds data necessary to calculate a coefficient matrix, filter parameters, and the like used in tone conversion. A buffer memory 104 temporarily holds each data during calculation.

In the image processing apparatus 2, a separation unit 201 separates an adaptation point image-attached tone-converted image output from the image processing apparatus 1 into an adaptation point image and tone-converted image.

A tone inverse conversion unit 202 performs tone inverse conversion for the tone-converted image based on the adaptation point image separated by the separation unit 201, reconstructing an original image.

In the tone inverse conversion unit 202, a chromatic adaptation conversion unit 2021 performs chromatic adaptation conversion for the tone-converted image, generating a chromatic adaptation image. A psychophysical value conversion unit 2022 performs psychophysical value conversion for the chromatic adaptation image, generating a psychophysical value image. A psychophysical value inverse conversion unit 2023 performs psychophysical value inverse conversion for the psychophysical value image using the Y component of the adaptation point image, generating a chromatic adaptation-converted image. A chromatic adaptation inverse conversion unit 2024 performs chromatic adaptation inverse conversion for the chromatic adaptation-converted image based on the adaptation point image, reconstructing an original image.

A data holding unit 203 and buffer memory 204 execute the same processes as those of the data holding unit 103 and buffer memory 104 in the image processing apparatus 1.

Tone-Converted Image Generation Process in Image Processing Apparatus 1

Figure 2A:
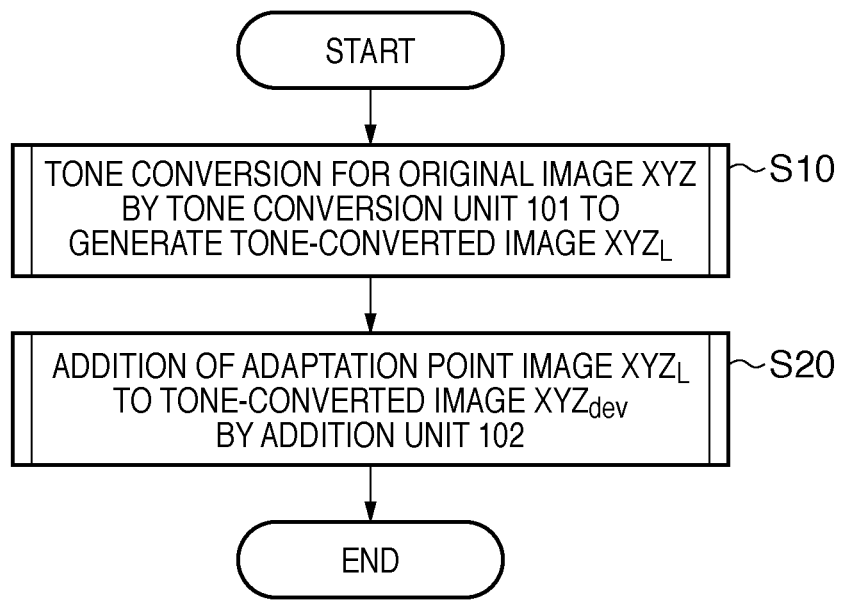
FIG. 2A is a flowchart showing a tone-converted image generation process in the embodiment.

A tone-converted image generation process in the image processing apparatus 1 will be described with reference to the flowchart of FIG. 2A.

In step S10, the tone conversion unit 101 acquires an original image XYZ, and generates a tone-converted image $XYZ_{dev}$ and adaptation point image $XYZ_L$ of the original image XYZ by tone conversion considering local adaptation. Details regarding the processing of the tone conversion unit 101 will be described later.

In step S20, the addition unit 102 acquires the tone-converted image $XYZ_{dev}$ and adaptation point image $XYZ_L$ generated by the tone conversion unit 101. The addition unit 102 adds the adaptation point image $XYZ_L$ to the tone-converted image $XYZ_{dev}$, generating an adaptation point image-attached tone-converted image $XYZ_{devL}$. Details regarding the processing of the addition unit 102 will be described later.

Original Image Reconstruction Process in Image Processing Apparatus 2

Figure 2B:
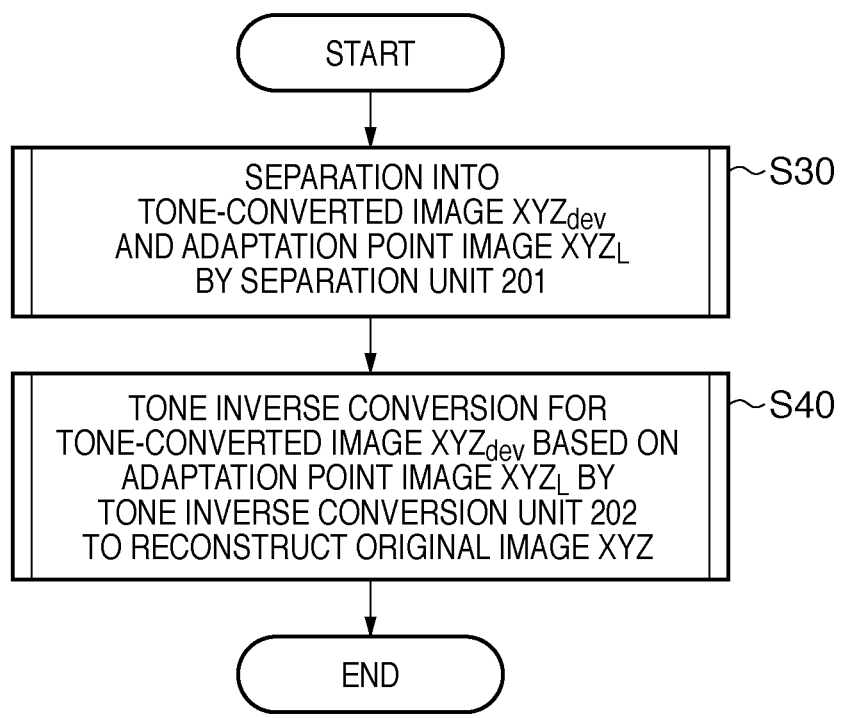
FIG. 2B is a flowchart showing an original image reconstruction process in the embodiment.

An original image reconstruction process in the image processing apparatus 2 will be explained with reference to the flowchart of FIG. 2B.

In step S30, the separation unit 201 acquires the adaptation point image-attached tone-converted image $XYZ_{devL}$, generated by the image processing apparatus 1. The separation unit 201 separates the adaptation point image-attached tone-converted image $XYZ_{devL}$ into the adaptation point image $XYZ_L$ and tone-converted image $XYZ_{dev}$. Details regarding the processing of the separation unit 201 will be described later.

In step S40, the tone inverse conversion unit 202 performs tone inverse conversion for the tone-converted image $XYZ_{dev}$ based on the adaptation point image $XYZ_L$ separated by the separation unit 201. Details regarding the processing of the tone inverse conversion unit 202 will be described later.

Tone Conversion Process in Tone Conversion Unit 101

The tone conversion process by the tone conversion unit 101 in step S10 described above will be explained with reference to the flowchart of FIG. 3.

In step S5101, the adaptation point calculation unit 1011 executes a smoothing process for the original image XYZ, generating an adaptation point image $XYZ_L$. The smoothing process suffices to use a smoothing filter such as a Gaussian filter or median filter. In the use of a Gaussian filter, it is desirable to use a value of ¼ to ½ of the short side of an image as the variance. In this example, the ½ value of the short side is adopted.

In step S102, the chromatic adaptation conversion unit 1012 performs chromatic adaptation conversion for the image XYZ using the adaptation point image $XYZ_L$ generated in step S101, generating a chromatic adaptation image $XYZ_C$. The chromatic adaptation conversion suffices to be one used in a color appearance model such as iCAM or iCAM06. The embodiment employs chromatic adaptation conversion equations (1) to (6) used in iCAM:

$$\begin{bmatrix} R \\ G \\ B \end{bmatrix} = M_{CAT02} \begin{bmatrix} X \\ Y \\ Z \end{bmatrix} \quad (1)$$

$$M_{CAT02} = \begin{bmatrix} 0.7328 & 0.4296 & -0.1624 \\ -0.7036 & 1.6975 & 0.0061 \\ 0.0030 & 0.0136 & 0.9834 \end{bmatrix} \quad (2)$$

$$D = F\left[1 - \left(\frac{1}{3.6}\right)e^{\left(\frac{-L_A-42}{92}\right)}\right] \quad (3)$$

$$X_C = \left[\left(Y_W \frac{D}{R_W}\right) + (1-D)\right]R \quad (4)$$

$$Y_C = \left[\left(Y_W \frac{D}{G_W}\right) + (1-D)\right]G \quad (5)$$

$$Z_C = \left[\left(Y_W \frac{D}{B_W}\right) + (1-D)\right]B \quad (6)$$

where $Y_W$ is the Y component of a white point, $L_A$ is the adaptation luminance and uses a 20% value of $Y_W$, and $R_W$, $G_W$, and $B_W$ are values obtained by converting the X, Y, and Z values of the white point in accordance with equation (1).

In step S103, the psychophysical value conversion unit 1013 performs psychophysical value conversion for the chromatic adaptation-converted image $XYZ_C$ using the Y component $Y_L$ of the adaptation point image $XYZ_L$, generating a psychophysical value image IPT. A color space IPT describing the psychophysical value image IPT is an orthogonal coordinate color space defined by three components, that is, lightness, red-green chromaticity, and yellow-blue chromaticity. When calculating a psychophysical value, the embodiment adopts psychophysical value conversion equations (7) to (11) used in iCAM:

$$\begin{bmatrix} L \\ M \\ S \end{bmatrix} = \begin{bmatrix} 0.4002 & 0.7075 & -0.0807 \\ -0.2280 & 1.1500 & 0.0612 \\ 0.0 & 0.0 & 0.9184 \end{bmatrix} \begin{bmatrix} X \\ Y \\ Z \end{bmatrix} \quad (7)$$

$$L' = L^{0.43}; L \geq 0 \quad (8)$$
$$L' = -|L|^{0.43}; L \leq 0$$

$$M' = M^{0.43}; M \geq 0 \quad (9)$$
$$M' = -|M|^{0.43}; M \leq 0$$

$$S' = S^{0.43}; S \geq 0 \quad (10)$$
$$S' = -|S|^{0.43}; S \leq 0$$

$$\begin{bmatrix} I \\ P \\ T \end{bmatrix} = \begin{bmatrix} 0.4000 & 0.4000 & 0.2000 \\ 4.4550 & -4.8510 & 0.3960 \\ 0.8056 & 0.3572 & -1.1628 \end{bmatrix} \begin{bmatrix} L' \\ M' \\ S' \end{bmatrix} \quad (11)$$

In step S104, the psychophysical value inverse conversion unit 1014 executes psychophysical value inverse conversion for the psychophysical value image IPT, generating a chromatic adaptation image $XYZ_{Cdev}$. Observation environment parameters used in conversion from IPT into $XYZ_{Cdev}$ are observation conditions defined by sRGB, that is, D65 as the device white point, D50 as the illumination color temperature, and 64 lx as the illumination illuminance.

In step S105, the chromatic adaptation inverse conversion unit 1015 performs chromatic adaptation inverse conversion for the chromatic adaptation image $XYZ_{Cdev}$, generating a sRGB image $XYZ_{dev}$.

In this manner, the tone conversion unit 101 calculates an adaptation point image by executing a smoothing process for an original image, and converts the tone of each pixel using the adaptation point image. By performing tone conversion using an adaptation point corresponding to each pixel, the tone conversion unit 101 can generate a tone-converted image free from a highlight detail loss at a highlight portion and a shadow detail loss at a shadow portion.

Image Addition Process in Addition Unit 102

The image addition process by the addition unit 102 in step S20 described above will be explained with reference to the flowchart of FIG. 4.

In step S102, the chromatic adaptation conversion unit 1012 performs chromatic adaptation conversion for the image XYZ using the adaptation point image $XYZ_L$ generated in step S101, generating a chromatic adaptation image $XYZ_C$. The chromatic adaptation conversion suffices to be one used in a color appearance model such as iCAM or iCAM06. The embodiment employs chromatic adaptation conversion equations (1) to (6) used in iCAM:

$$\begin{bmatrix} R \\ G \\ B \end{bmatrix} = M_{CAT02} \begin{bmatrix} X \\ Y \\ Z \end{bmatrix} \quad (1)$$

$$M_{CAT02} = \begin{bmatrix} 0.7328 & 0.4296 & -0.1624 \\ -0.7036 & 1.6975 & 0.0061 \\ 0.0030 & 0.0136 & 0.9834 \end{bmatrix} \quad (2)$$

$$D = F\left[1 - \left(\frac{1}{3.6}\right)e^{\left(\frac{-L_A-42}{92}\right)}\right] \quad (3)$$

$$X_C = \left[\left(Y_W \frac{D}{R_W}\right) + (1-D)\right]R \quad (4)$$

-continued $$Y_C = \left[\left(Y_W \frac{D}{G_W}\right) + (1-D)\right]G \quad (5)$$

$$Z_C = \left[\left(Y_W \frac{D}{B_W}\right) + (1-D)\right]B \quad (6)$$

where F is a factor determining the degree of adaptation, $L_A$ is the adaptation luminance and uses a 20% value of $Y_L$, $Y_W$ equals $Y_L$, and $R_W$, $G_W$, and $B_W$ are values obtained by converting the $X_L$, $Y_L$ and $Z_L$ in accordance with equation (1).

In step S103, the psychophysical value conversion unit 1013 performs psychophysical value conversion for the chromatic adaptation-converted image $XYZ_C$ using the Y component $Y_L$ of the adaptation point image $XYZ_L$, generating a psychophysical value image IPT. A color space IPT describing the psychophysical value image IPT is an orthogonal coordinate color space defined by three components, that is, lightness, red-green chromaticity, and yellow-blue chromaticity. When calculating a psychophysical value, the embodiment adopts psychophysical value conversion equations (7) to (11) used in iCAM:

$$\begin{bmatrix} L \\ M \\ S \end{bmatrix} = \begin{bmatrix} 0.4002 & 0.7075 & -0.0807 \\ -0.2280 & 1.1500 & 0.0612 \\ 0.0 & 0.0 & 0.9184 \end{bmatrix} \begin{bmatrix} X_c \\ Y_c \\ Z_c \end{bmatrix} \quad (7.1)$$

$$F_L = 0.2\left(\frac{1}{(5L_A+1)}\right)^4 (5L_A) + 0.1\left(1 - \left(\frac{1}{(5L_A+1)}\right)^4\right)^2 (5L_A)^{\frac{1}{3}} \quad (7.2)$$

$$L' = L^{0.43F_L}; L \geq 0 \quad (8)$$
$$L' = -|L|^{0.43F_L}; L \leq 0$$

$$M' = M^{0.43F_L}; M \geq 0 \quad (9)$$
$$M' = -|M|^{0.43F_L}; M \leq 0$$

$$S' = S^{0.43F_L}; S \geq 0 \quad (10)$$
$$S' = -|S|^{0.43F_L}; S \leq 0$$

$$\begin{bmatrix} I \\ P \\ T \end{bmatrix} = \begin{bmatrix} 0.4000 & 0.4000 & 0.2000 \\ 4.4550 & -4.8510 & 0.3960 \\ 0.8056 & 0.3572 & -1.1628 \end{bmatrix} \begin{bmatrix} L' \\ M' \\ S' \end{bmatrix} \quad (11)$$

In this way, the addition unit 102 adds an adaptation point image to the tone-converted image generated in step S10. At this time, the data structure as shown in FIG. 5 is employed. For a predetermined pixel in a tone-converted image, a corresponding pixel in the adaptation point image can be referred to, obtaining an adaptation point at the pixel.

Image Separation Process in Separation Unit 201

Figure 6:
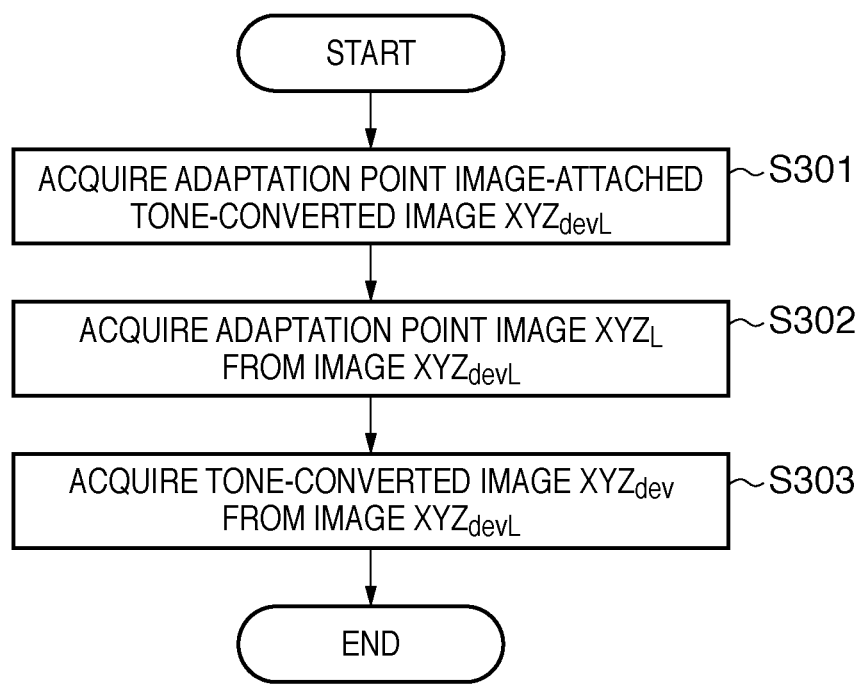
FIG. 6 is a flowchart showing an image separation process in the embodiment.

The image separation process by the separation unit 201 in step S30 described above will be explained with reference to the flowchart of FIG. 6.

In step S301, the separation unit 201 acquires the adaptation point image-attached tone-converted image $XYZ_{devL}$ generated in step S20. In step S302, the separation unit 201 acquires the adaptation point image $XYZ_L$ from $XYZ_{devL}$ acquired in step S301.

In step S303, the separation unit 201 acquires the tone-converted image $XYZ_{dev}$ from $XYZ_{devL}$ acquired in step S301.

In this way, the separation unit 201 acquires the adaptation point image-attached tone-converted image generated in step S20, and separates it into an adaptation point image and tone-converted image.

Tone Inverse Conversion Process in Tone Inverse Conversion Unit 202

The tone inverse conversion process by the tone inverse conversion unit 202 in step S40 described above will be explained with reference to the flowchart of FIG. 7.

In step S401, the tone inverse conversion unit 202 acquires the tone-converted image $XYZ_{dev}$ separated in step S30. In step S402, the tone inverse conversion unit 202 acquires the adaptation point image $XYZ_L$ separated in step S30.

In step S403, the chromatic adaptation conversion unit 2021 executes chromatic adaptation conversion for the tone-converted image $XYZ_{dev}$ acquired in step S401, generating a chromatic adaptation image $XYZ_{Cdev}$.

In step S404, the psychophysical value conversion unit 2022 performs psychophysical value conversion for the chromatic adaptation image $XYZ_{Cdev}$ generated in step S403, generating a psychophysical value image IPT. Observation environment parameters used in conversion from a chromatic adaptation image into a psychophysical value image are the same as observation conditions defined by sRGB that are used in step S10.

In step S405, the psychophysical value inverse conversion unit 2023 executes psychophysical value inverse conversion for the psychophysical value image IPT using the Y component $Y_L$ of the adaptation point image acquired in step S402, generating a chromatic adaptation image $XYZ_C$.

In step S406, the chromatic adaptation inverse conversion unit 2024 executes chromatic adaptation inverse conversion for the chromatic adaptation image $XYZ_C$ generated in step S405, reconstructing the original image XYZ. The chromatic adaptation inverse conversion uses the adaptation point image $XYZ_L$ acquired in step S402. More specifically, when inversely converting a predetermined pixel of the chromatic adaptation image $XYZ_C$, a corresponding pixel value in the adaptation point image $XYZ_L$ is acquired and calculated as an adaptation point.

When inversely converting the tone of a tone-converted image, the tone inverse conversion unit 202 uses an adaptation point at each pixel that is used when converting the tone of the original image. The original image can therefore be faithfully reconstructed from the tone-converted image.

As described above, according to the first embodiment, simultaneously when a tone-converted image is generated from an original image, an adaptation point image is generated and added to the tone-converted image. When reconstructing the original image from the tone-converted image, the tone-converted image undergoes tone inverse conversion based on the adaptation point image. As a result, the original image can be reconstructed faithfully.

Second Embodiment

The second embodiment according to the present invention will be described. In the first embodiment, an adaptation point image is added to a tone-converted image, and an original image is faithfully reconstructed using the adaptation point image in inverse conversion. In contrast, in the second embodiment, an adaptation point image to be added to a tone-converted image is compressed based on the frequency characteristic, thereby reducing the data amount.

Apparatus Arrangement

FIGS. 8A and 8B are block diagrams each showing a hardware arrangement which implements an image processing apparatus in the second embodiment. FIG. 8A shows an image processing apparatus 3 on the transmitting side, that is, tone-converted image generating side. FIG. 8B shows an image processing apparatus 4 on the receiving side, that is, the original image reconstructing side. In FIGS. 8A and 8B, the same reference numerals as those in FIGS. 1A and 1B described in the first embodiment denote the same parts, and a description thereof will be omitted.

In the image processing apparatus 3, an adaptation information compression unit 301 compresses the data amount of an adaptation point image generated by a tone conversion unit 101, generating a compressed adaptation point image (to be referred to as a compressed image).

In the image processing apparatus 4, an adaptation information decompression unit 401 acquires a compressed image separated by a separation unit 201 and decompresses the compressed image, generating an original adaptation point image.

Tone-converted Image Generation Process in Image Processing Apparatus 3

A tone-converted image generation process in the image processing apparatus 3 will be described with reference to the flowchart of FIG. 9B.

Figure 9A:
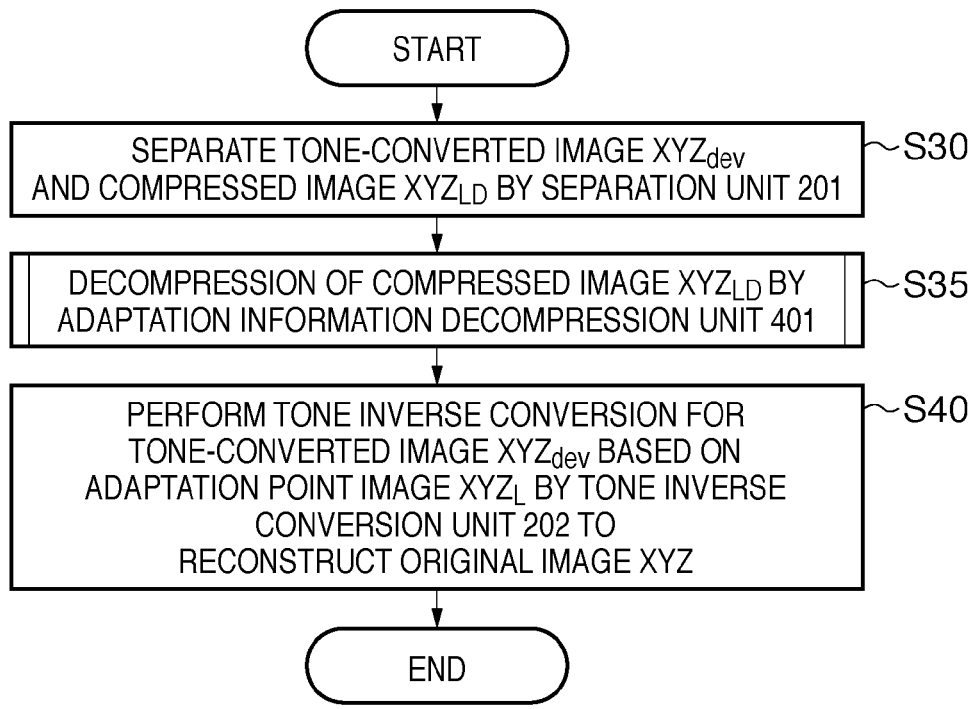
FIG. 9A is a flowchart showing a tone-converted image generation process in the second embodiment.
Figure 9B:
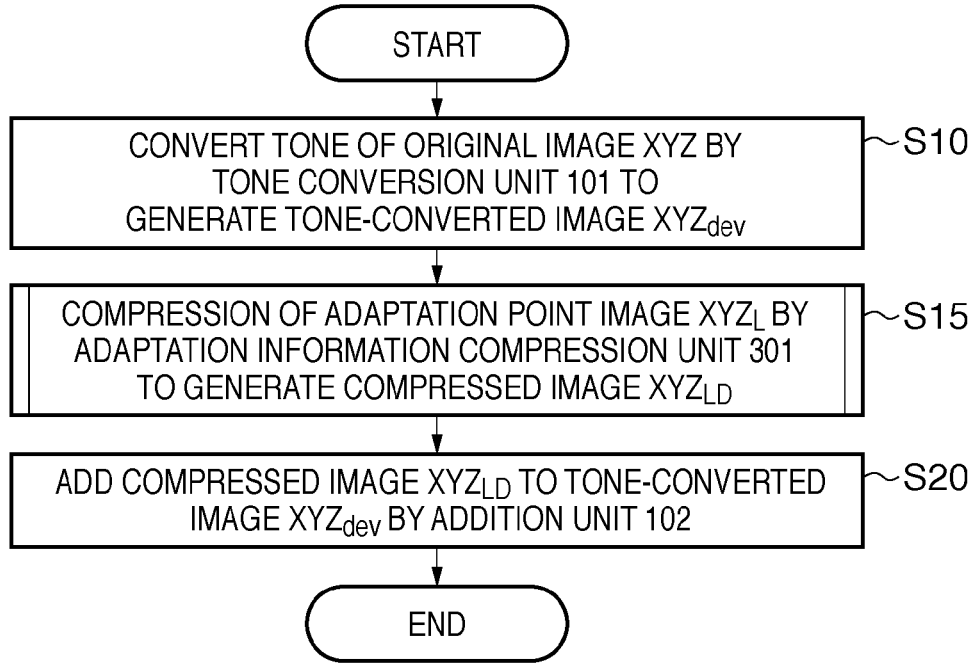
FIG. 9B is a flowchart showing an original image reconstruction process in the second embodiment.

Steps S10 and S20 in FIG. 9B are the same as those in the foregoing first embodiment, and a description thereof will be omitted. In the image processing apparatus 3 of the second embodiment, the adaptation information compression unit 301 acquires an adaptation point image $XYZ_L$ generated in step S10 and generates a compressed image $XYZ_{LD}$ in step S15. Details regarding the processing of the adaptation information compression unit 301 will be described later.

Original Image Reconstruction Process in Image Processing Apparatus 4

An original image reconstruction process in the image processing apparatus 4 will be described with reference to the flowchart of FIG. 9A.

Steps S30 and S40 in FIG. 9A are the same as those in the foregoing first embodiment, and a description thereof will be omitted. In the image processing apparatus 4 of the second embodiment, the adaptation information decompression unit 401 acquires and decompresses a compressed image $XYZ_{LD}$ separated in step S30, acquiring an adaptation point image in step S35. Details regarding the processing of the adaptation information decompression unit 401 will be described later.

Compression Process in Adaptation Information Compression Unit 301

Figure 10:
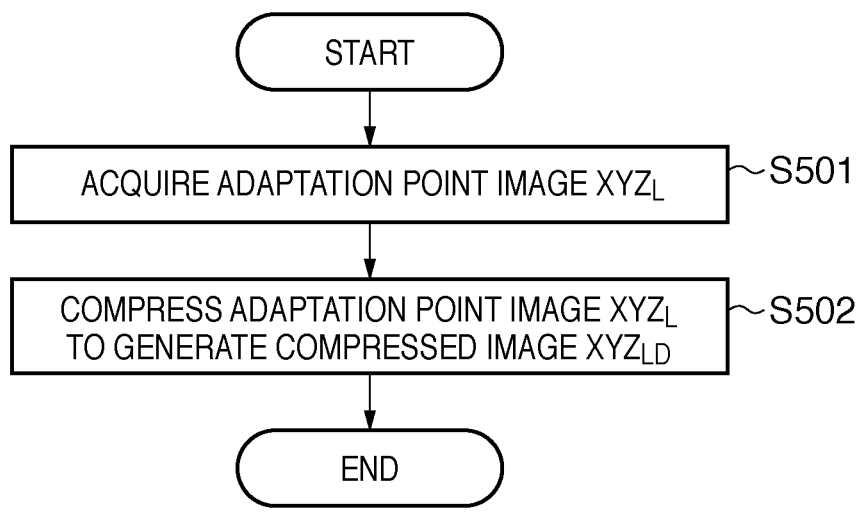
FIG. 10 is a flowchart showing an adaptation information compression process in the second embodiment.

The compression process by the adaptation information compression unit 301 in step S15 described above will be explained with reference to the flowchart of FIG. 10.

In step S501, the adaptation information compression unit 301 acquires an adaptation point image $XYZ_L$ generated in step S10.

In step S502, the adaptation information compression unit 301 compresses the adaptation point image $XYZ_L$ acquired in step S501, generating a compressed image $XYZ_{LD}$. At this time, attention is given to the frequency characteristic of the adaptation point image to be compressed. Since the adaptation point image $XYZ_L$ has undergone a low-pass filter process in step S10, the maximum frequency in the image is limited. That is, the adaptation point image $XYZ_L$ is an image whose frequency band is limited by the cutoff frequency of the low-pass filter. According to Shannon's sampling theorem, an original signal can be completely reconstructed from an obtained sampling sequence by setting the cutoff frequency to be $\omega 0$ Hz and the sampling interval T to be smaller than $1/(2\omega 0)$ (generally called a Nyquist interval). The second embodiment therefore reduces the data amount by down-sampling the adaptation point image $XYZ_L$ at the sampling interval of $1/(2\omega 0)$.

In this manner, the adaptation information compression unit 301 reduces the data amount by down-sampling an adaptation point image based on its frequency characteristic. By adjusting the sampling interval to the Nyquist interval, an original adaptation point image can be perfectly reconstructed.

Decompression Process in Adaptation Information Decompression Unit 401

Figure 11:
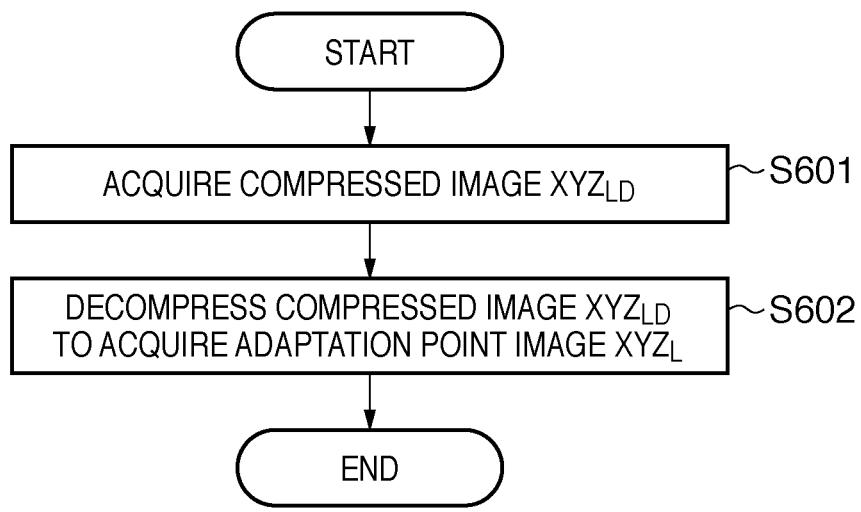
FIG. 11 is a flowchart showing an adaptation information decompression process in the second embodiment.

The decompression process by the adaptation information decompression unit 401 in step S35 described above will be explained with reference to the flowchart of FIG. 11.

In step S601, the adaptation information decompression unit 401 acquires a compressed image $XYZ_{LD}$ separated in step S30.

In step S602, the adaptation information decompression unit 401 decompresses the compressed image $XYZ_{LD}$ acquired in step S601, reconstructing an original adaptation point image $XYZ_L$. Since the compressed image $XYZ_{LD}$ has been down-sampled at $1/(2\omega 0)$ in step S502, it is up-sampled here at $2\omega 0$. As a result, the original adaptation point image $XYZ_L$ can be completely reconstructed.

In this fashion, the adaptation information decompression unit 401 reconstructs an original adaptation point image from a compressed image by up-sampling the compressed image based on the sampling interval used to compress the adaptation point image.

As described above, according to the second embodiment, an adaptation point image generated in tone conversion is compressed, and the compressed image is added to a tone-converted image, thereby reducing the total data amount. The data amount can be efficiently reduced because the adaptation point image is compressed at a compression ratio based on the frequency characteristic of the low-pass filter used to generate the adaptation point image. Since the sampling interval indicating the compression ratio is the Nyquist interval, an original adaptation point image can be reconstructed perfectly.

Third Embodiment

The third embodiment according to the present invention will be described. In the second embodiment, the data amount is reduced by compressing an adaptation point image and adding the compressed image to a tone-converted image. In contrast, the third embodiment further focuses on the fact that the spatial range affecting local adaptation changes depending on the observation distance when observing an image. The frequency characteristic of the low-pass filter used to generate an adaptation point image is controlled based on the observation distance.

Observation Distance and Frequency Characteristic

Figure 12:
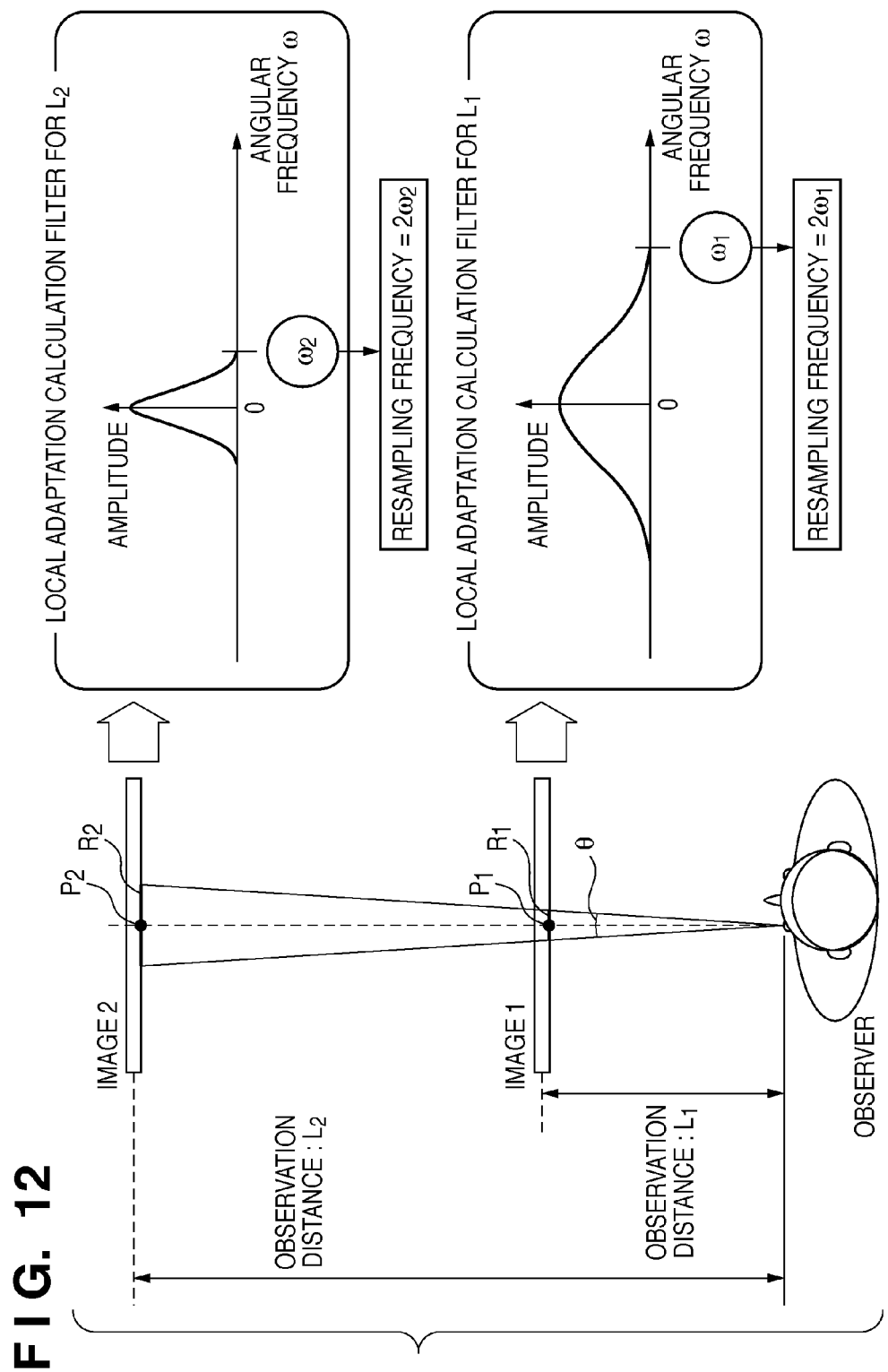
FIG. 12 is a view showing the relationship between the observation distance and the frequency characteristic of a filter in the third embodiment.

FIG. 12 shows the relationship between the observation distance and the frequency characteristic of a local adaptation calculation filter. A schematic view on the left side in FIG. 12 shows a state in which an observer observes images at different distances.

In the view on the left side in FIG. 12, R1 represents a spatial range affecting local adaptation when the observer focuses on a point P1 on image 1 at an observation distance L1. Since the range R1 is narrow with respect to the entire image 1, only pixels around the point P1 of interest affect adaptation, that is, the degree of smoothing of an original image is low. In this case, the local adaptation calculation filter needs to have a characteristic for passing even relatively high frequency components as represented by $\omega 1$ a lower view on the right side in FIG. 12.

In contrast, R2 represents a spatial range affecting local adaptation when the observer focuses on a point P2 on image 2 at an observation distance L2. Since the range R2 is wide with respect to the entire image 2, even pixels in a region spaced apart from the point P2 of interest affect adaptation, that is, the degree of smoothing an original image is high. In this case, the local adaptation calculation filter needs to have a characteristic for passing only low frequency components as represented by ω2 in an upper view on the right side in FIG. 12.

In the third embodiment, based on the characteristics described with reference to FIG. 12, an optimum adaptation point image is generated in accordance with the observation distance by controlling the frequency characteristic of the low-pass filter used to generate an adaptation point image. The third embodiment can prevent degradation of the image quality caused by a flare which is generated due to an improper filter characteristic and appears at a boundary having a large lightness difference in the image.

In consideration of this, the third embodiment will be described in detail.

Apparatus Arrangement

Figure 13:
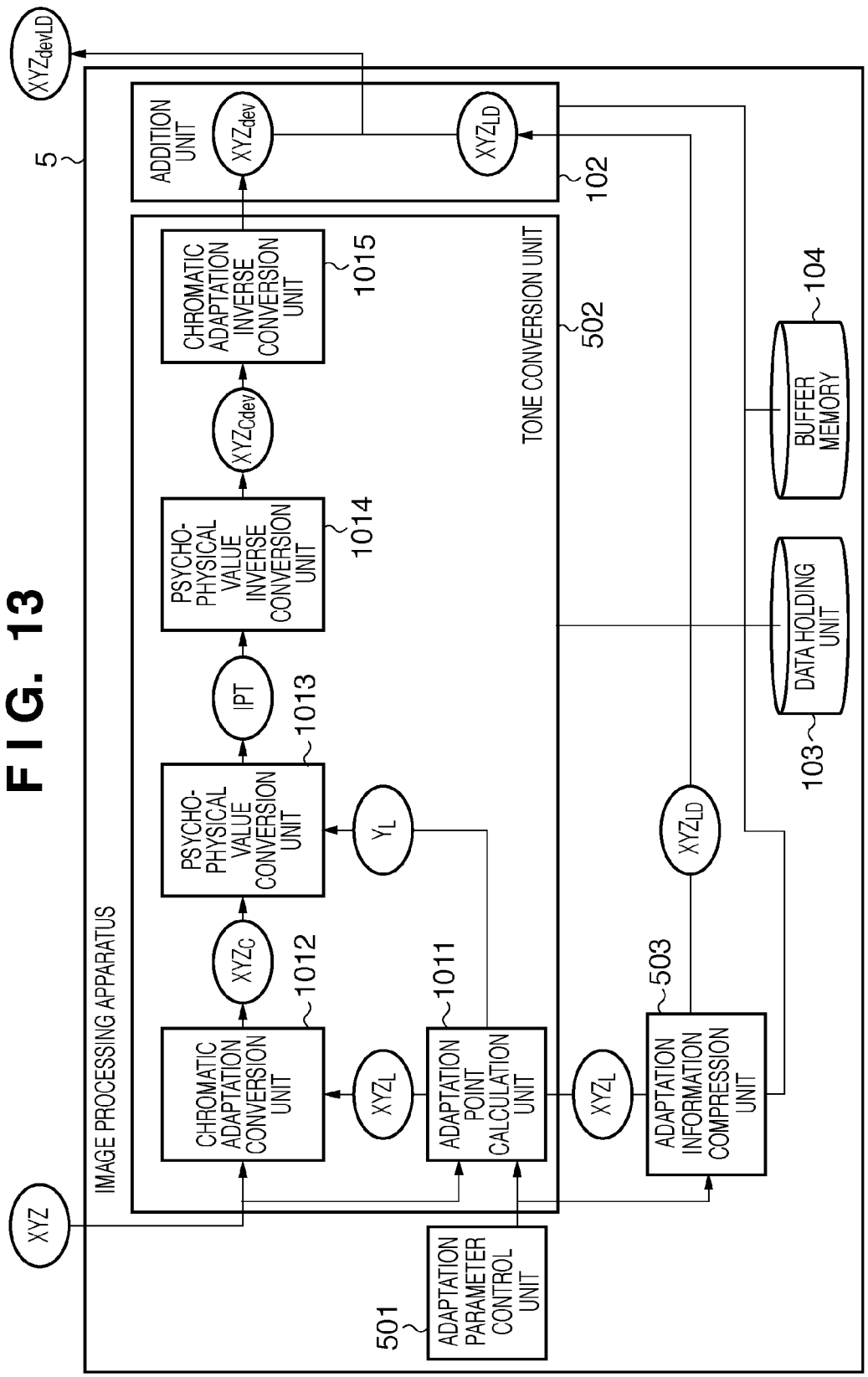
FIG. 13 is a block diagram showing the arrangement of an image processing apparatus on the transmitting side in the third embodiment.

FIG. 13 is a block diagram showing the hardware arrangement of an image processing apparatus 5 on the transmitting side, that is, tone-converted image generating side in the third embodiment. Note that an image processing apparatus on the receiving side, that is, original image reconstructing side in the third embodiment is the same as that in FIG. 8B described in the second embodiment. In FIG. 13, the same reference numerals as those in FIG. 8A described in the second embodiment denote the same parts, and a description thereof will be omitted.

Figure 14:
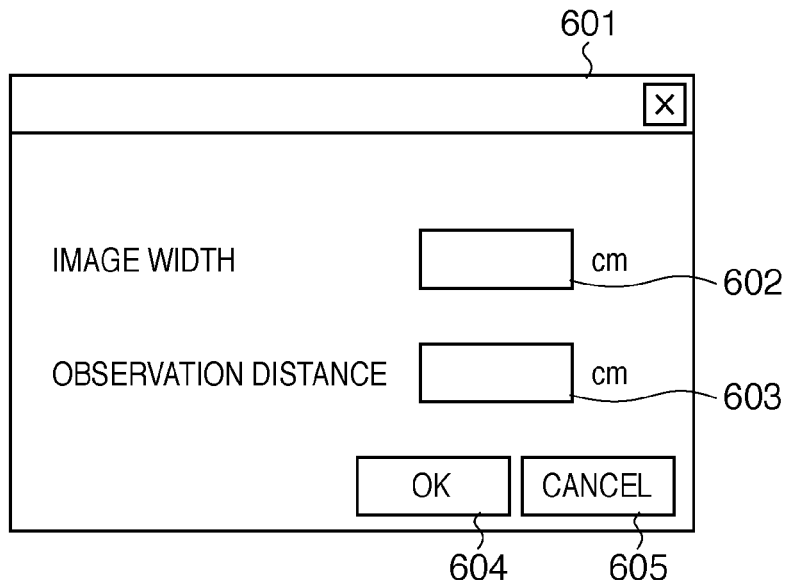
FIG. 14 is a view exemplifying input of observation conditions in the third embodiment.

In the image processing apparatus 5, an adaptation parameter control unit 501 acquires an observation condition such as the observation distance when observing an original image. Based on the observation condition, the adaptation parameter control unit 501 calculates the cutoff frequency of the low-pass filter used to generate an adaptation point image. Note that the observation condition is acquired using, for example, a user interface (to be referred to as a UI) 601 as shown in FIG. 14. More specifically, the UI 601 is displayed to prompt the user to input an image width 602 and observation distance 603. When the user presses an OK button 604, the input values are acquired.

A tone conversion unit 502 acquires the cutoff frequency calculated by the adaptation parameter control unit 501, and generates an adaptation point image from an original image based on the cutoff frequency. Then, the tone conversion unit 502 performs tone conversion based on the adaptation point image for the original image.

An adaptation information compression unit 503 acquires the cutoff frequency calculated by the adaptation parameter control unit 501 and the adaptation point image generated by the tone conversion unit 502. The adaptation information compression unit 503 down-samples the adaptation point image based on the cutoff frequency, generating a compressed image.

Tone-converted Image Generation Process in Image Processing Apparatus 5

Figure 15:
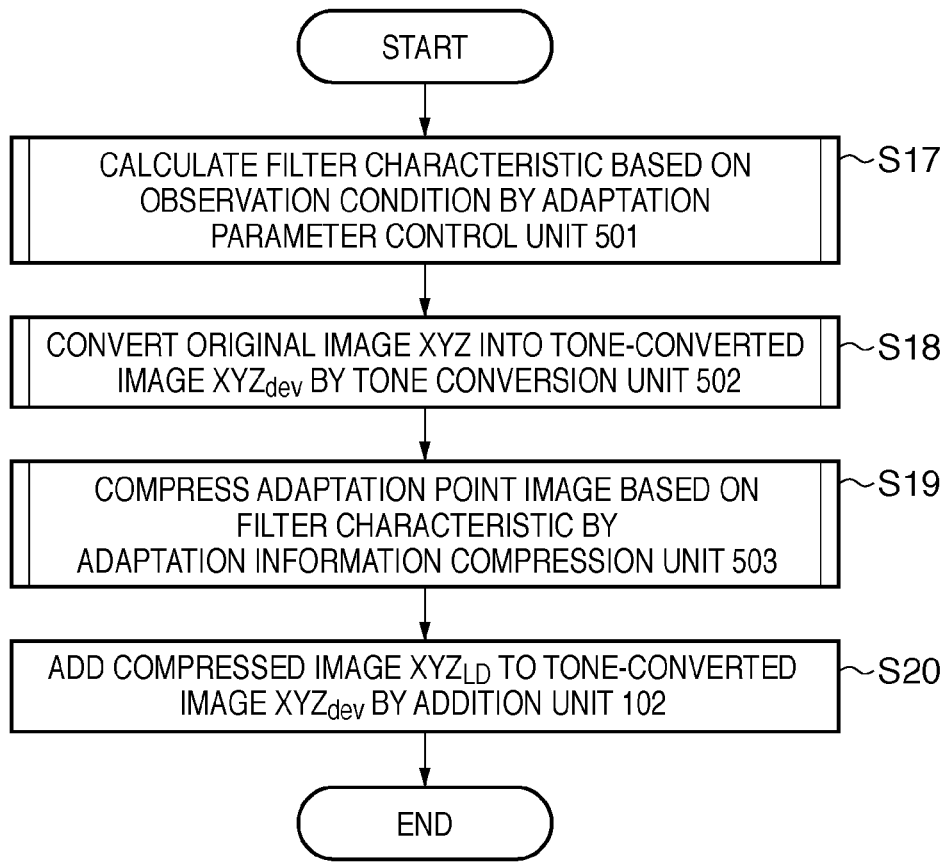
FIG. 15 is a flowchart showing a tone-converted image generation process in the third embodiment.

A tone-converted image generation process in the image processing apparatus 5 will be described with reference to the flowchart of FIG. 15.

In step S17, the adaptation parameter control unit 501 acquires an observation condition, and calculates, based on the observation condition, the cutoff frequency ω of the low-pass filter applied to an adaptation point image.

In step S18, the tone conversion unit 502 executes a low-pass filter process for an original image XYZ based on the cutoff frequency ω calculated in step S17, generating an adaptation point image $XYZ_L$. The tone conversion unit 502 generates a tone-converted image $XYZ_{dev}$ from the original image XYZ using the adaptation point image $XYZ_L$.

In step S19, the adaptation information compression unit 503 acquires the cutoff frequency ω calculated in step S17 and the adaptation point image $XYZ_L$ generated in step S18. Then, the adaptation information compression unit 503 resamples the adaptation point image $XYZ_L$ at the sampling interval of 1/(2ω), generating a compressed image $XYZ_{LD}$.

In step S20, an addition unit 102 adds the adaptation point image $XYZ_L$ to the tone-converted image $XYZ_{dev}$, generating an adaptation point image-attached tone-converted image $XYZ_{devL}$. This process is the same as those in the first and second embodiments, and a description thereof will be omitted.

As described above, according to the third embodiment, an adaptation point image corresponding to the observation distance when observing an image is generated. The tone of an original image is converted using the adaptation point image, thereby generating an optimum tone-converted image in accordance with the observation distance. The third embodiment can therefore prevent degradation of the image quality caused by a flare at a boundary having a large lightness difference in an image. Further, an original adaptation point image can be completely reconstructed from a compressed image because the adaptation point image is compressed at a compression ratio considering the maximum frequency in the adaptation point image. By inversely converting a tone-converted image using the reconstructed adaptation point image, an original image can be faithfully reconstructed.

<Modification>

The above embodiments have described the XYZ color space as a color space for describing an original image and tone-converted image, but the present invention is not limited to this. For example, a generally used device RGB space is also available. At this time, device RGB values and XYZ values are mutually converted according to equations or models of conversion from the device RGB space into the XYZ space. An original image and tone-converted image may be described in a color space capable of expressing colors, such as CIELAB or CIELUV, in addition to the device RGB space. Further, these images may be described in the form of a spectral distribution. In this case, a conversion unit from the spectral distribution into XYZ is arranged.

The embodiments have described the sRGB color space as a color space for a tone-converted image. However, the present invention is not limited to this, and a color space such as the AdobeRGB color space or scRGB color space is also usable.

In the embodiments, the start address of adaptation point image data is recorded in the header area, but the present invention is not limited to this. For example, it is defined in advance to add adaptation point image data after the end of tone-converted image data so that the adaptation point image data can be referred to. Any data structure is available as long as adaptation point image data can be referred to.

In the second embodiment, an adaptation point image is compressed and decompressed by resampling, but the present invention is not limited to this. For example, an information compression method such as predictive coding, transform coding, vector quantization, or entropy coding is available. Also, units for executing these information compression methods may be connected at multiple stages after resampling. In this case, a decompression process is executed in an order opposite to a compression process.

In the second embodiment, the sampling interval of an adaptation point image is the Nyquist interval, but the present invention is not limited to this. For example, when attenuation in a frequency domain equal to or higher than the cutoff frequency of the low-pass filter is moderate, the sampling interval may be set narrower than the Nyquist interval to avoid aliasing.

In the third embodiment, the cutoff frequency of the low-pass filter used to generate an adaptation point image is controlled based on the observation distance, but the present invention is not limited to this. For example, when a Gaussian filter is used to smooth an original image, the variance may be controlled. Further, the degree of smoothing may be decreased for a short observation distance and increased for a long observation distance.

In the third embodiment, the observation distance is used as an observation condition, but the present invention is not limited to this. For example, the observation condition suffices to be at least one of the view angle, resolution, and visual acuity, that is, a parameter regarding the spatial range affecting local adaptation.

The arrangements described in the embodiments can be combined with each other without departing from the scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-112981, filed May 7, 2009, which is hereby incorporated by reference herein in its entirety.

What is claimed is:

1. An image processing apparatus comprising:
a generation unit adapted to generate adaptation point image data indicating an adaptation point corresponding to each pixel of original image data;
a tone conversion unit adapted to convert a tone of the original image data based on the adaptation point image data, generating converted image data;
an addition unit adapted to add the adaptation point image data to the converted image data;
wherein said generation unit generates the adaptation point image data by performing a smoothing process on the original image data; and
an acquisition unit which acquires an observation condition of an original image represented by the original image data, wherein said generation unit generates the adaptation point image data by performing a smoothing process based on the observation condition on the original image data.

2. The apparatus according to claim 1, wherein said generation unit calculates a cutoff frequency of a filter used in the smoothing process based on the observation condition.

3. The apparatus according to claim 1, wherein the observation condition includes at least one of an observation distance, a view angle, and a resolution.

4. The apparatus according to claim 1, further comprising a compression unit which compresses the adaptation point image data, generating compressed image data, wherein said addition unit adds the compressed image data to the converted image data.

5. The apparatus according to claim 4, wherein said compression unit compresses the adaptation point image data at a compression ratio based on a frequency characteristic of the adaptation point image data.

6. The apparatus according to claim 5, wherein said compression unit compresses the adaptation point image data by sampling the adaptation point image data at a Nyquist interval.

7. An image processing method comprising the steps of:
generating adaptation point image data indicating an adaptation point corresponding to each pixel of original image data;
converting a tone of the original image data based on the adaptation point image data to generate converted image data; and
adding the adaptation point image data to the converted image data;
wherein said generating step generates the adaptation point image data by performing a smoothing process on the original image data; and
acquiring an observation condition of an original image represented by the original image data, wherein said generating step generates the adaptation point image data by performing a smoothing process based on the observation condition on the original image data.

8. A non-transitory computer-readable storage medium storing a program for controlling a computer, the program causing the computer to function as
a generation unit adapted to generate adaptation point image data indicating an adaptation point corresponding to each pixel of original image data,
a tone conversion unit adapted to convert a tone of the original image data based on the adaptation point image data, generating converted image data, and
an addition unit adapted to add the adaptation point image data to the converted image data;
wherein said generation unit generates the adaptation point image data by performing a smoothing process on the original image data; and
an acquisition unit which acquires an observation condition of an original image represented by the original image data, wherein said generation unit generates the adaptation point image data by performing a smoothing process based on the observation condition on the original image data.

* * * * *